United States Patent
Radway

(10) Patent No.: US 6,997,119 B2
(45) Date of Patent: Feb. 14, 2006

(54) COMBUSTION EMISSIONS CONTROL AND UTILIZATION OF BYPRODUCTS

(76) Inventor: Jerrold E. Radway, 9903 Indian Creek La., El Cajon, CA (US) 92021

(*) Notice: Subject to any disclaimer, the term of this patent is extended or adjusted under 35 U.S.C. 154(b) by 391 days.

(21) Appl. No.: 10/200,387

(22) Filed: Jul. 23, 2002

(65) Prior Publication Data

US 2004/0018133 A1 Jan. 29, 2004

(51) Int. Cl.
*C10L 10/00* (2006.01)
*C10L 10/04* (2006.01)

(52) U.S. Cl. .................. 110/343; 110/344; 110/345; 423/242.2; 423/243.08

(58) Field of Classification Search ............. 110/343, 110/344, 345; 423/243.08, 242.2
See application file for complete search history.

(56) References Cited

U.S. PATENT DOCUMENTS

| | | | |
|---|---|---|---|
| 3,234,580 A | 2/1966 | Keck | 15/302 |
| 4,388,283 A | 6/1983 | Abrams et al. | 423/244.07 |
| 4,490,341 A | 12/1984 | Cares | 423/243.08 |
| 4,788,918 A | 12/1988 | Keller | 110/215 |
| 4,842,617 A | 6/1989 | Kukin | 44/51 |
| 4,867,961 A | 9/1989 | Palmer | 423/522 |
| 4,976,936 A | 12/1990 | Rathi et al. | 423/242 |
| 4,996,032 A | 2/1991 | Stowe, Jr. et al. | 423/242 |
| 5,039,499 A | 8/1991 | Stowe, Jr. | 423/242 |
| 5,084,255 A | 1/1992 | College et al. | 423/242 |
| 5,220,875 A * | 6/1993 | Cox | 110/345 |
| 5,260,045 A | 11/1993 | Moser et al. | 423/243.09 |
| 5,439,658 A | 8/1995 | Johnson et al. | 423/243.07 |
| 5,499,587 A * | 3/1996 | Rodriquez et al. | 110/342 |
| 5,607,654 A | 3/1997 | Lerner | 423/240 S |
| 5,614,158 A | 3/1997 | College | 423/166 |
| 5,658,547 A * | 8/1997 | Michalak et al. | 423/243.08 |
| 5,695,726 A | 12/1997 | Lerner | 423/210 |
| 5,814,288 A | 9/1998 | Madden et al. | 423/244.01 |
| 6,214,313 B1 | 4/2001 | Berisko et al. | 423/638 |
| 6,289,827 B1 * | 9/2001 | Wajer et al. | 110/345 |
| 6,817,304 B1 * | 11/2004 | Martin et al. | 110/345 |
| 2002/0170475 A1 * | 11/2002 | Kukin et al. | 110/343 |

OTHER PUBLICATIONS

Reduction in Sulphur Trioxide Emission From Power Stations, by Ong Liong Chuan, paper published at a time prior to Jun. 1998.

(Continued)

*Primary Examiner*—Wayne A. Langel
(74) *Attorney, Agent, or Firm*—Alfred J. Mangels

(57) ABSTRACT

A process for controlling both fireside ash deposits and corrosion, and fouling, corrosion, and emissions due to $SO_3$ formation within a fossil-fuel-fired combustion system, such as a furnace forming part of an electrical power generating plant. A solution of a soluble magnesium compound, which can be derived from wastes, such as the bleed stream from the power plant's $SO_2$ scrubber, is injected into the combustion products within the furnace in the form of a fine spray and at a point at which the temperature is sufficiently high to produce submicron-size MgO particles. The $SO_3$ reacts with the MgO particles to form $MgSO_4$. Insoluble magnesium compounds can be added to the solution to produce larger (micron sized) MgO particles on thermal decomposition. The micron-sized MgO particles are deposited on furnace surfaces to reduce ash deposits and to reduce catalytic generation of $SO_3$. The boiler wastes can be reacted with other industrial process waste products to provide marketable chemicals.

24 Claims, 4 Drawing Sheets

OTHER PUBLICATIONS

Effects on Catalytic Activity and $SO_2/SO_3$ Conversion of $DeNO_x$ Catalytic Converters Downstream of Oil-Fired Power Plants: Causes and Remedial Measures, by K. Hüttenhoffer et al., EPRt/EPA Joint symposium and Stationary combustion $NO_x$ Control, May 24-27, 1993, Miami Beach, Florida.

Jerrold E. Radway, "All You Ever Wanted to Know About Additive Application and Testing," presented at Engineering Foundation Conference on Mineral Matter and Ash Deposition from Coal, Santa Barbara, California, Feb. 21-26, 1988.

W. Brockman, et al., "Concept Development, Pilot Testing, and Design Leading to Conversion of the Wm. H. Zimmer FGD System to Bleed Stream Oxidation," presented at Mega Symposium, Aug. 1999.

M. Golightley, et al., "Lime-Based Forced Oxidation to Gypsum at First Energy's Bruce Mansfield Station," presented at Mega Symposium, Aug. 1999.

* cited by examiner

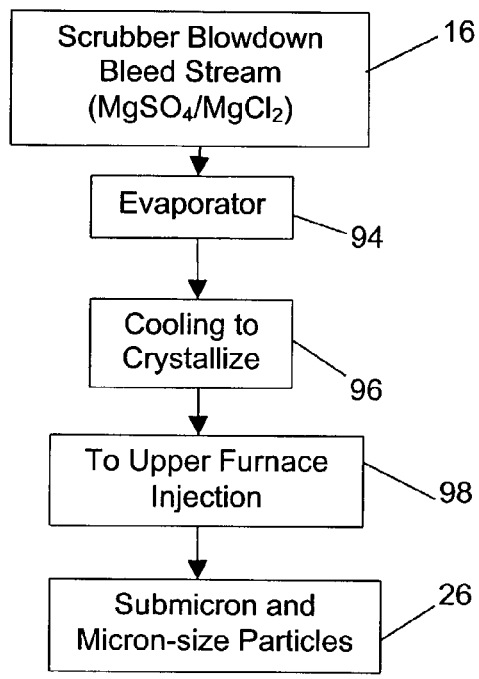
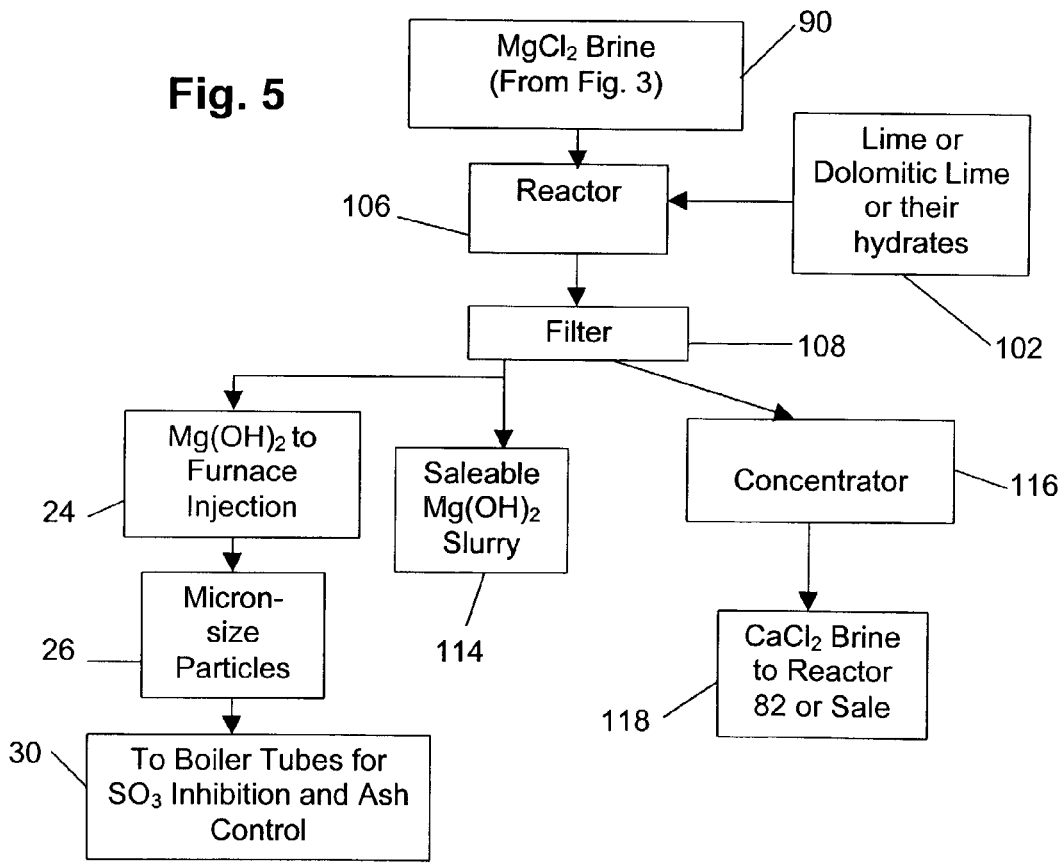

COMBUSTION EMISSIONS CONTROL AND UTILIZATION OF BYPRODUCTS

BACKGROUND OF THE INVENTION

1. Field of the Invention

The present invention relates to processes for utilizing industrial wastes and industrial process byproducts to help reduce emissions of undesirable compounds, improve operating economics, and to provide useful chemicals from such wastes and byproducts. More particularly, the present invention relates to processes for the practical utilization of industrial wastes/process byproducts, such as those resulting from the operation of electrical power generating plants, and also to enhance power generating plant operability. The processes of this invention help to reduce environmental damage from byproducts of the operation of such plants, and they also can be utilized for producing marketable chemicals from such byproducts.

2. Description of the Related Art

In fossil-fuel-fired power generating plants, as well as in other industrial processes involving combustion of fossil fuels, the products of the combustion process include compounds that are environmentally undesirable, and the discharge of which into the environment is often subject to environmental regulations. Such compounds include sulfur oxides ($SO_x$) and nitrogen oxides ($NO_x$). In order to meet environmental limitations affecting the discharge of $SO_x$ into the atmosphere, combustion products from such plants and processes are commonly passed through flue gas desulfurization (FGD) systems to block their discharge into the atmosphere by converting the sulfur oxides contained in such combustion products into less-environmentally-harmful insoluble compounds that are either disposed of in landfills or that, when suitably modified or treated, are sold as marketable chemicals The treatment of flue gases is often effected in lime- or limestone-based wet scrubbers, in which lime or limestone slurries are sprayed into the flue gases before they are discharged into the atmosphere. The sulfur oxides present in the flue gases are thereby chemically converted into insoluble calcium compounds in the form of calcium sulfites or sulfates. Those calcium compounds, which are less environmentally harmful, are separated from the scrubber blowdown liquor and either are disposed of in landfills or are converted into marketable gypsum.

Because the scrubber blowdown liquor is collected within the scrubber, withdrawn, and recycled by reintroduction into the scrubber to continuously treat the flue gases, soluble impurities that form during the scrubbing process and that remain in the blowdown liquor tend to increase in concentration as the liquor is reused after separation of the calcium compounds. The impurities, derived largely from the lime or limestone, tend to be primarily magnesium salts (sulfate, bisulfite, and chloride), with lesser amounts of sodium, potassium, and calcium compounds. The concentrations of those soluble impurities will vary, based upon particular process operating practices and conditions. The amount of total dissolved solids present in the blowdown liquor is usually controlled by the bleed or withdrawal rate and can ultimately rise to be of the order of about 6% or 7%, after which treatment of the liquor to remove dissolved solids should be undertaken. Discharge of such dissolved solids to local streams or lakes is generally environmentally unacceptable, and thus there is a need for an acceptable way to reuse or to dispose of the scrubber blowdown liquors.

Although useful for converting some sulfur oxides, widely-used lime/limestone scrubbers are not very effective in capturing the 1% to 1.5% of the sulfur in the fuel that is transformed during the combustion process into gaseous $SO_3$, which can escape from the scrubber. The $SO_3$ also poses operating problems within the furnace itself, in that it leads to corrosion and fouling of low temperature heat exchange surfaces. Additionally, it poses environmental problems in that unless captured or transformed the $SO_3$ in the flue gas results in a persistent, visible stack discharge plume, which can contain corrosive and potentially hazardous sulfuric acid fumes. Further complicating the matter, selective catalytic reactors, which are available and are generally being installed in such plants to comply with nitrogen oxide emission regulations, essentially cause a doubling of the amount of $SO_3$ that is generated, and consequently the already serious operational and environmental problems caused by the presence of $SO_3$ are magnified. In the past, the $SO_3$ emission problem has been addressed chemically using commercially-available, but relatively expensive, oil-based magnesium additives.

One of the more effective chemical techniques for controlling both ash-related fouling in the furnace, and also the corrosion and emission problems associated with $SO_3$ generated in coal-fired furnaces, is the injection into the upper region of the furnace of oil slurries of MgO or $Mg(OH)_2$. That technology was originally developed for use with oil-fired furnaces, in which the magnesium additives were usually metered into the fuel. It was later applied to coal-fired furnaces, in which the most widely accepted mode of application of such additives today has been by injection of slurries of MgO or $Mg(OH)_2$ into the furnace above the burners and just below the region at which a transition from radiant heat transfer to convective heat transfer occurs.

In addition to the oil-based slurries, magnesium-containing powders and water-based $Mg(OH)_2$ slurries have also been utilized as fireside additives in boilers, but because of their generally coarser particle size they are less efficient in capturing the $SO_3$. Water slurries of MgO have been injected through specially modified soot blowers on oil- and Kraft-liquor-fired boilers, where they moderated high temperature deposit problems but had only nominal impact on $SO_3$-related problems because of an inability to apply the chemicals on a continuous basis, resulting from the intermittent, rather than continuous, operation of the soot blowers.

Although the powders and the water-based slurries containing magnesium that have been utilized in the past have had some inhibiting effect on $SO_3$ formation, the overall efficiency of utilization as an $SO_3$ treatment vehicle is relatively poor. The lower efficiency of utilization therefore requires that higher quantities of such additives be injected. However, such higher quantities of the injected materials can adversely impact the marketability of the coal fly ash that is collected in the precipitator, because the higher additive quantities increase the proportion of undesirable $MgSO_4$ in the fly ash. Both magnesium and sulfate can be tolerated in marketable fly ash, but only at modest levels.

Industry practice in efforts to reduce ash-related fouling have primarily involved the introduction of the oil- or water-based slurries into the upper region of the furnace at locations where the temperatures are high enough to decompose the materials to provide the active ingredient MgO. But it does not appear that there has been employed a combination of application techniques that are designed to achieve maximum efficiency by treating each fireside problem—ash deposits, corrosion, and emissions—with a chemical form and an application mode that are best suited to solve a particular problem Introduction of previous magnesium additives into the upper, high temperature region of the furnace for $SO_3$ inhibition has been only partially effective. Attempts have been made to enhance performance efficiency both by injecting oil- or water-based slurries in the high temperature region of the furnace and by supplementing that hot section additive with a cold end additive at the cold section of the plant, generally after the precipitator. The cold end additive is intended to neutralize $SO_3$ that is not captured by the additives injected into the higher temperature sections of the furnace. Generally, the cold end additive is an MgO powder that is blended with a flow-improving agent to mitigate the difficult problems often encountered in handling and metering relatively fine solids. Although use of a cold end additive avoids potentially adverse impacts on precipitator performance, the stoichiometric excess required can be as much as one order of magnitude higher than with furnace injection. There is thus a need for a more effective treatment approach.

Byproducts produced in the course of power generation and in the course of controlling and minimizing adverse environmental consequences of power generation plant operation are often considered not to be commercially useful. For example, in fossil-fueled power generating plants in which magnesium oxide is utilized in gas desulfurization systems, significant amounts of mixed magnesium sulfites and magnesium sulfates are produced as a byproduct and are discarded in landfills. Typical concentrations in such byproducts are about 80% magnesium sulfite and the balance magnesium sulfate.

Insoluble calcium sulfites or calcium sulfates that are produced in lime or limestone scrubbers utilized in flue gas desulfurization systems are often disposed of in landfills after separation from the scrubber liquor. Such systems are utilized in power generation plants or in industrial process plants in which high-sulfur fossil fuels are burned, and they generate large quantities of those compounds as they convert the undesirable and environmentally-regulated emissions of sulfur dioxide into the calcium sulfites or sulfates. In an effort to avoid landfill costs, more and more of those compounds are being converted to marketable gypsum by oxidation in the scrubber or in a separate vessel.

And after separation of the sulfites and sulfates from the limestone scrubbers and recycling of the blowdown stream, the resultant scrubber liquor contains soluble impurities that tend to increase in concentration over time with continued recycling. Such impurities, which are derived largely from the limestone, tend to be primarily magnesium salts (sulfate, bisulfite, and chloride), with lesser amounts of calcium, sodium, and potassium compounds. The concentrations can vary with operating practice, and can be of the order of about 6 to 7%. Although those salts are not particularly toxic, discharge into local streams or lakes is often environmentally unacceptable, even after treatment.

In the limestone industry significant quantities of fine limestone particles are produced in the course of crushing and screening operations. Such particles are of the order of −60 mesh and finer, and are either calcium carbonates or calcium and magnesium carbonates. Because such fine particles generally have not passed through a calciner, they retain much of the carbon dioxide that was present in the limestone. However, they have little or no commercial value in and of themselves and are therefore usually discarded.

In some metallurgical and organic chemical processes, including titanium production, significant amounts of hydrochloric and sulfuric acids are produced as byproducts, neutralized, and the resulting soluble salts discharged to the environment. The concentrations and impurity levels and constituents vary with the acid and the source. Weaker concentrations of hydrochloric acids, of the order of about 18 to 28%, are considered to be waste products because commercial grades of HCl are typically concentrations of 32% or more. With respect to sulfuric acids, commercially-significant concentrations are normally 98% or more, whereas byproduct acids generally have concentrations of 93% or less and include organic contaminants.

In steelmaking furnaces and cement kilns, used refractory brick are generally discarded. A significant fraction of such used brick are of the magnesitic or dolomitic variety and are initially relatively pure (98%) magnesium oxide and a mixture of calcium and magnesium oxide. The bricks are generally formed using pitch or other bonding agents, which along with iron from the molten steel after use in furnaces result in impurities that lower the oxide concentrations in used bricks to within the range of about 77% to about 93%.

It is therefore an object of the present invention to provide processes for treating fossil-fuel-fired furnace fireside and emissions problems.

It is another object of the present invention to provide processes by which otherwise-disposed-of byproducts of industrial processes can be effectively utilized, either as more effective furnace additives or as separately marketable chemical compounds.

SUMMARY OF THE INVENTION

Briefly stated, in accordance with one aspect of the present invention, a process is provided for reducing fossil-fuel-fired furnace operating and emissions problems, such as ash deposits, corrosion, and $SO_3$ emissions discharges. The process includes providing a liquid containing at least one soluble magnesium compound and at least one insoluble magnesium compound. The liquid is introduced into an upper region of a furnace at a point where the temperature within the furnace is sufficiently high to decompose the magnesium compounds to provide a multiplicity of fine magnesium oxide particles having particle sizes smaller than one micron, to react with $SO_3$ within the furnace to form $MgSO_4$, and to provide magnesium oxide particles having particle sizes that range from about one micron to about five microns, for deposit on furnace internal surfaces to coat the surfaces and to impede catalytic generation of $SO_3$ at the coated furnace internal surfaces. The $MgSO_4$ is collected in a collection zone downstream of the furnace.

In accordance with another aspect of the present invention, methods are provided for producing marketable chemicals from scrubber blowdown streams produced by wet-scrubber-type flue gas desulfurization units and from waste products produced in other industrial processes.

BRIEF DESCRIPTION OF THE DRAWINGS

FIG. 4 is a flow chart showing the steps in a further process for providing marketable chemicals from industrial process waste products.

FIG. 5 is a flow chart showing the steps in still another process for providing marketable chemicals from industrial process waste products.

DESCRIPTION OF THE PREFERRED EMBODIMENTS

Figure 1:
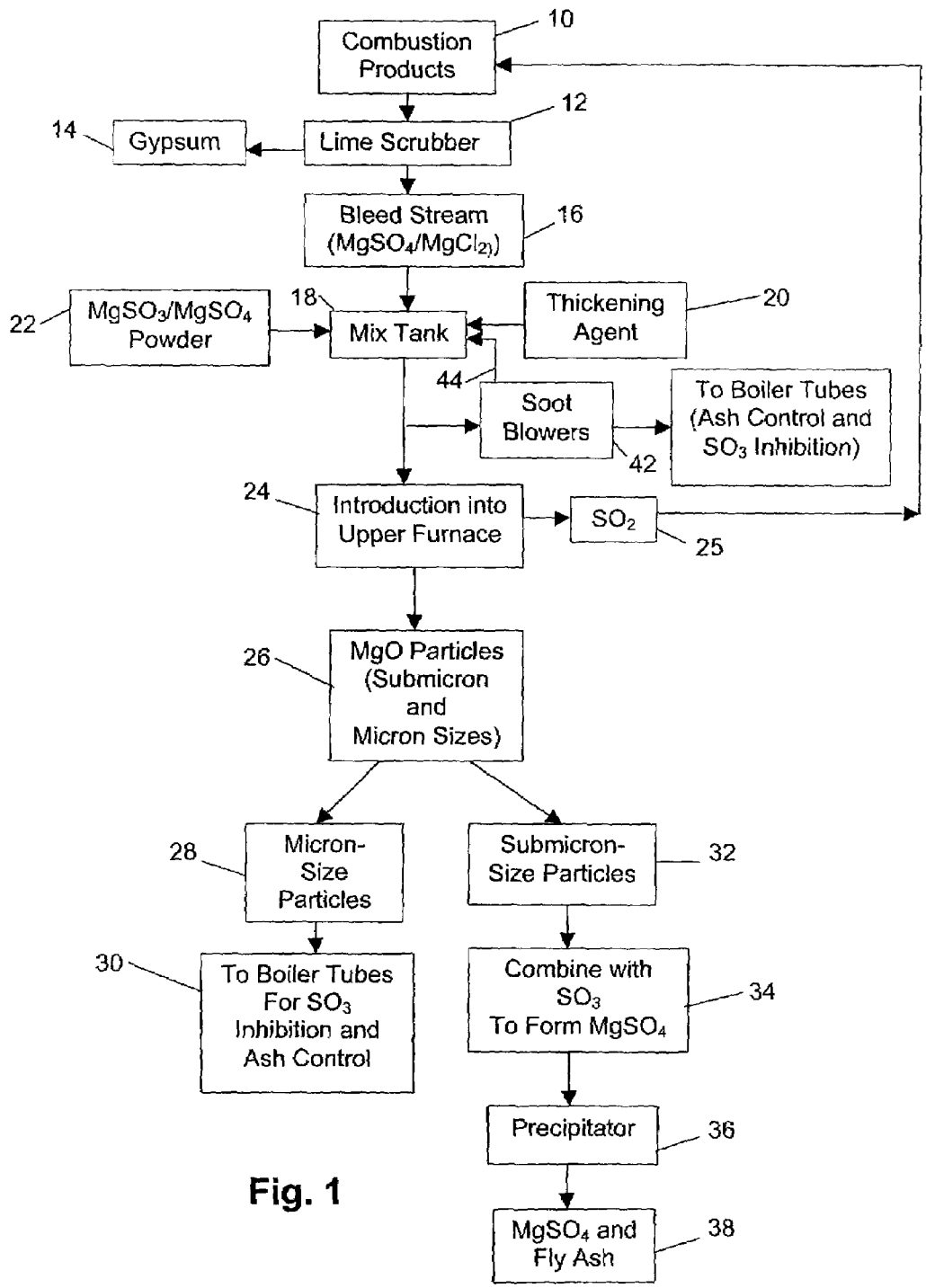
FIG. 1 is a flow chart showing a process in accordance with the present invention for reducing undesirable furnace emissions, for reducing furnace ash deposits, and for providing marketable chemicals from industrial process waste products.

Fireside ash deposits, corrosion of internal furnace surfaces, and $SO_3$-related problems in coal-fired combustion systems can be addressed far more efficiently and with simpler application equipment by injecting directly into the high temperature region of the furnace combinations of additives that contain magnesium and that decompose upon heating to yield both submicron- and micron-size MgO particles. The additives can be either formulated mixtures of water- or oil-based compounds or separate streams that are blended immediately prior to the injector nozzles, such as by an in-line mixer. The latter approach is preferred because it allows optimizing the proportion of submicron and micron size particles for each combustion system. Desirably, when heated to a temperature that is sufficiently high to drive off the water or oil in the mixture and to decompose the magnesium-containing material, the magnesium compounds yield MgO particles that fall into the following two size ranges: one particle size range that is submicron (smaller than 1 micron), preferably less than about 0.5 micron, and the other particle size range that is from about 1 to about 5 microns. The different sizes of the MgO particles function differently within such combustion systems, but both particle sizes are effective in reducing particular fireside problems, and both particle sizes are necessary in order to realize the maximum benefit from the use of such materials.

Submicron-size MgO particles can be produced by grinding solid magnesium compounds, but can more readily be derived from soluble magnesium compounds contained in aqueous or organic solutions. The most economically desirable organic form is what are known as overbased organic compounds in oilbased liquids. Such compounds, which are widely used in automotive crankcase oils, are essentially colloidal dispersions of $MgCO_3$ in a lubricating oil, stabilized by other magnesium compounds, such as sulfonates.

The submicron-size MgO particles provide effective $SO_3$ control within the furnace. The large number of those ultra-fine particles (billions per pound) are produced when the magnesium-containing solutions disclosed herein, prepared using soluble, magnesium-containing compounds, are introduced into the high temperature regions of the furnace. The resulting fine particles act as a gas and mix with, come into contact with, and react with the $SO_3$. Because of their small particle size, the submicron-size MgO particles that are produced remain suspended in the gaseous combustion products. Most of those particles do not come into contact with the boiler tube surfaces. Instead, they remain in suspension within the furnace and come into contact with and react with the gaseous $SO_3$ in the lower temperature regions of the furnace to produce $MgSO_4$. Fortunately, the resulting $MgSO_4$ particles have particle sizes that are larger than the particle sizes of the reactants. Thus they are no longer fine enough to pose a threat to the SCR catalyst (under 0.2 microns) and are amenable to collection in a downstream precipitator and scrubber that are typically part of plants containing such combustion systems.

The larger size MgO particles, those that are from about 1 to about 5 microns in size (hereinafter referred to as "micron-size particles"), are generally derived from solid compounds of magnesium, such as those produced either by controlled precipitation or by wet or dry grinding of insoluble magnesium-containing compounds. The micron-size particles that are produced tend to come into contact with, adhere to, and coat the surfaces of boiler tubes in the convective heat transfer section of the furnace. By virtue of the coating that forms on the tube surfaces, the catalytic effect of the iron oxide on those surfaces, which tend to promote $SO_3$ formation, is impeded.

Additionally, the micron-size particles that coat the boiler tubes in the convective pass of the furnace also result in reduced adhesion of ash deposits on those tubes. In that regard, it is believed that the micron-size MgO particles react with the ash particles to alter their characteristics, possibly by raising the ash fusion temperature to a sufficiently high fusion temperature level such that the ash is rendered less adherent to the surfaces of the boiler tubes. Although the micron-size MgO particles do tend to scavenge some $SO_3$, the efficiency of that scavenging process is low relative to the efficiency of the submicron-size particles in providing that result. That efficiency difference can possibly be attributed to differences in the available surface areas of the respective particles, but unpublished data indicate that a shell of $MgSO_4$ inhibits reaction of the MgO core beneath the shell.

One type of solution that is suitable for use as a control of fireside problems within furnaces has been found to be scrubber blowdown liquors that are withdrawn from calcium-based flue gas desulfurization units. The blowdown liquor can be effectively utilized, either with or without prior treatment to precipitate some MgO solids, by injecting it into the furnace at zones in which the temperatures are sufficiently high, of the order of from about 2,100° F. to about 2,400° F., to convert the magnesium compounds into the desirable submicron- and micron-sized MgO particles and gaseous $SO_2$ and HCl. The $SO_2$ that is derived from the blowdown liquor, like the $SO_2$ that is produced during combustion, is largely converted within a downstream scrubber into insoluble calcium sulfite or sulfate. The HCl is also captured in the scrubber and ends up in the bleed stream primarily as $MgCl_2$. The MgO captures $SO_3$ which otherwise would either corrode the boiler or exit the stack as a gray plume. As a result, the injection of scrubber blowdown liquors into appropriate portions of the furnace increases the proportion of undesirable sulfur that is removed from the combustion products before discharge through the stack into the atmosphere.

Such a beneficial use of the scrubber blowdown liquor as described above avoids the need to discharge the liquor and its magnesium salts into water courses. Additionally, such a use of those liquors will also inhibit the catalysis of $SO_2$ into the more undesirable $SO_3$, and the MgO particles will also convert a significant portion of the $SO_3$ into particulate $MgSO_4$, which is amenable to capture in the dust collection systems included in such combustion systems.

When so injected into the furnace, a significant fraction of the MgO produced by reaction of the injected magnesium compounds will also react with and will combine with some of the ash deposits within the boiler. Those ash deposits either will be retained within the furnace or they will be captured in a downstream dust collector and eventually discarded to landfill in the form of insoluble compounds, such as alumino silicates, along with the uncombined boiler ash.

Thus, because they contain mainly magnesium salts, the oxidized scrubber blowdown streams from $SO_2$ scrubbers can advantageously be used as fireside additives in fossil-fuel-fired furnaces to control ash deposits, to control $SO_3$-related corrosion and fouling, and to control emissions. Those streams generally tend to be relatively dilute (of the order of about 2% to about 7% sulfates, with lesser amounts of chlorides), which can pose an economic penalty in terms of the heat that is lost in evaporating the water in the solution, if the solution is injected into the boiler without enrichment by the addition of magnesium compounds. Generally, however, the positive economic benefits that accrue from the reduced need for furnace maintenance, from the higher furnace operating efficiency, from the reduced level of corrosion within the furnace, and from the reduced emissions of environmentally-undesirable materials, will collectively be significantly greater than the heat loss penalty.

However, the blowdown streams can readily be enriched to provide a higher concentration of magnesium compounds. Such enrichment can be accomplished either by multistage evaporation of the water contained in the blowdown stream, or, alternatively, by the addition of further quantities of those same magnesium salts obtained from other sources. For example, other waste streams that would otherwise be discarded could provide the desired magnesium enrichment, such as a mixture of solid $MgSO_3$ and $MgSO_4$ that are generated in flue gas desulfurization systems employing magnesium compounds, or the product of a reaction between an acid stream, such as an organic-contaminated 93% sulfuric acid and various solid magnesium-containing wastes. Possible sources of waste magnesium compounds include such materials as used MgO refractory brick that has been crushed and ground, dross from magnesium metal processing, the bleed stream itself (See FIG. 5), or flue dust from calcining magnesium compounds.

If the solids from MgO scrubbing of flue gas are selected to provide desired enrichment of the scrubber blowdown stream, the furnace injection solution will be a suspension of solid $MgSO_3$ in a $MgSO_4$ solution. When that solution is injected directly into the upper furnace, and is also injected through selected soot blowers to directly contact those boiler tubes that generally exhibit the most serious deposit buildup problems, the resulting MgO will have a broad range of particle sizes (both micron and submicron). It can therefore be effective in efficiently treating each of the major fireside problems encountered in fossil-fuel-fired combustion systems—slagging, fouling, corrosion, and $SO_3$ emissions—because the mixture of solution and solid particulates will yield the desired submicron- and micron-sized MgO particles. As noted earlier herein, the different ranges of particle sizes have different effects, and both particle size ranges are needed in order to realize the maximum benefits in terms of operating efficiency and reduction of undesired emissions constituents.

The scrubber blowdown stream can be injected into the upper furnace region through spray nozzles that preferably uniformly disperse the blowdown stream in the form of small droplets into the stream of combustion products. Such a spraying process upstream of the boiler tubes, coupled with the introduction of additional blowdown stream spray into only a few, selected soot blowers, (or, alternatively, applied directly on tube surfaces by a so-called "water cannon") to more directly treat selected boiler tubes, maximizes utilization efficiency of the injected material and minimizes the total dosage that would otherwise be needed to achieve the desired results. It allows a high dosage to be directly applied to only those small regions of boiler tube surfaces that might need treatment with higher MgO dosages in order to alter ash properties or to raise the fusion temperature of the ash deposits, while the quantity of the less-focused, direct furnace injection of the blowdown stream can be adjusted to react with the $SO_3$ that is formed as a product of the combustion process, and also to minimize $SO_3$ formation by providing a thin coating on the boiler tubes.

If the blowdown stream is enriched to a concentration of at least about 20%, either by evaporation of solution or by the addition of what otherwise would be soluble magnesium-containing waste materials, the slight negative impact on boiler thermal efficiency resulting from the injection of the solution into the furnace will be lessened. As long as the active constituents remain in solution they will largely yield the submicron-size MgO particles upon thermal decomposition of the magnesium salts at the temperatures within the upper furnace. In order to also provide the desired micron-size particles, and thereby maximize the benefits that are possible by utilizing MgO treatment, one can prepare, or can apply in slurry form, a solid magnesium compound that will decompose into micron-size MgO particles at upper furnace temperatures. Such magnesium compounds include $MgSO_4$, $MgSO_3$, $MgCO_3$, $MgNO_2$, $MgCl_2$, magnesium acetate, a $Mg(OH)_2$ slurry, and some dolomitic materials. Slurrying of additional MgO in a $MgSO_4$ or $MgCl_2$ solution should be avoided, because there is a tendency for such slurries to form hydraulic-setting cements. The most economical source of such magnesium compounds is likely to be on-site preparation of one or more of the herein-identified compounds from the blowdown stream and from other magnesium-containing waste products, because of the high cost of shipping two pounds of water for each pound of active MgO in the commercial products that contain 55% to 60% solids.

One method of recycling a scrubber bleed or purge stream is disclosed in U.S. Pat. No. 4,996,032, entitled "Process for Removing Sulfur Dioxide from Flue Gases," which issued on Feb. 26, 1991, to Donald H. Stowe, Jr. et al. The method involves oxidation of the sulfites to sulfates, treating the sulfates with slaked lime to precipitate both gypsum and $Mg(OH)_2$, and then partial separation of the two solids using wet cyclone separators. That method yields a gypsum stream that can be recycled to a gypsum-recovery operation, and a low purity, relatively coarse (5 to 7 microns median particle size) $Mg(OH)_2$ (65 to 70%) product containing 30 to 35% fine gypsum. Markets for that quality $Mg(OH)_2$ are not presently known to exist, although the impure mixture has been experimentally injected into boiler furnaces of two large power plants to address slagging, fouling, and $SO_3$-related problems. The quantities required to adequately control $SO_3$ emissions were very high, about 10 or 11 times the quantity of commercially-available, oil-based fireside additives found to be effective. Moreover, such a large quantity requirement is high enough to possibly adversely affect the marketability for cement applications of the resulting boiler fly ash.

When the relatively coarse (a median particle size of about 5 to 7 microns) $Mg(OH)_2$/gypsum slurry as described in the Stowe et al. patent is injected into a furnace, the high temperatures within the furnace cause decomposition of the $Mg(OH)_2$ to MgO which functions like the MgO- or $Mg(OH)_2$-based oil slurries that have similarly-sized particles. In full-scale boiler trials, the quantities of such a $Mg(OH)_2$/gypsum slurry that was required to capture $SO_3$ in coal-fired systems were 6 to 11 times that experienced with the long-term use of the oil-based additives in boilers firing similar fuels.

As noted previously, products that yield both micron- and submicron-size MgO particles are preferably introduced directly into the upper furnace by injection. The injection can be in the form of a spray, if desired. The furnace injection mode of application minimizes the loss of active magnesium constituents with the bottom ash, which would occur if the constituents were to be added directly to the fuel instead of by injection into the upper furnace. Moreover, direct addition to the fuel does not provide uniformly optimum performance in treating the various fireside problems that the presence of MgO particles of the sizes disclosed herein can resolve.

It is desirable to attempt to overcome, or to substantially reduce or minimize, all of the fireside problems simultaneously, through targeted application of the appropriate type of chemical to each problem area. For example, as noted earlier herein, a solution of soluble magnesium compounds, which yield submicron-size MgO particles upon heating to upper furnace temperatures, with solid $Mg(OH)_2$ or other magnesium-based compounds, which yield micron-size MgO particles upon heating to upper furnace temperatures, can be injected into the upper furnace to reduce $SO_3$ emissions. In that regard, as used herein the term "upper furnace temperature" means temperatures between about 2000° F. and about 2,400° F. Further, the proportions of micron- and submicron-size MgO particles that are produced in the upper furnace can be adjusted by changing the ratio of soluble magnesium-containing compounds to insoluble magnesium-containing compounds to maximize capture of the $SO_3$ produced as a combustion product, and also to provide a desired degree of inhibition of catalytic formation of $SO_3$ and to minimize boiler tube ash deposits.

A slurry of $Mg(OH)_2$, or of other solids-based magnesium-containing compounds, can simultaneously be applied directly to selected boiler tube surfaces by modified soot blowers that direct the slurry toward the boiler tubes. Alternatively, other slurry application devices can be utilized, such as a water cannon, which permit focused application of the chemical in those few regions within the furnace where ash deposits normally accumulate on the boiler tube surfaces and can cause ash buildup. Typically, that application can involve the use of from two to about six modified soot blowers, to avoid excessively treating the entire boiler with micron-sized material, which tends to have poorer utilization efficiency with respect to $SO_3$ control. The solids-based magnesium-containing compounds, upon heating to furnace temperatures, result in the micron-size MgO particles that provide ash deposit control.

If the additive applications described above achieve the desired reduction in ash deposits and $SO_3$, but result in sulfate or magnesium levels in the fly ash that threaten ash marketability, an eventuality considered to be unlikely but possible, the volume of materials injected during in-furnace treatments can be reduced, and an $Mg(OH)_2$ slurry, a $Mg(OH)_2$ powder, or a MgO powder can be injected into the gas stream at a point downstream of the precipitator. Magnesium carbonate, magnesium sulfate, and magnesium chloride are believed to be unsuitable for injection at that point in the system, because the temperatures downstream of the precipitator are not sufficiently high to cause those compounds to decompose and to provide the desired MgO particles.

The chemical reactions that take place when the scrubber blowdown liquor is injected into the high temperature region of the furnace are shown below. Both the magnesium sulfite and sulfate in the MgO-based flue gas desulfurization byproduct will yield MgO and $SO_2$ upon decomposition. Those reactions are applicable whether or not the blowdown liquor is enriched by other magnesium-containing compounds, such as those that are identified above. However, the particle size distributions and the reactivity of the MgO particles that are produced may differ with the magnesium source compound.

$$MgSO_3(\text{fine solid}) + \text{heat} \rightarrow MgO(\text{micron-size particles}) + SO_2(\text{gas})$$

$$MgSO_4(\text{solution}) + \text{heat} \rightarrow MgO(\text{submicron-size particles}) + SO_2 + \tfrac{1}{2}O_2$$

$$Mg(OH)_2(\text{solid}) + \text{heat} \rightarrow MgO(\text{micron-size particles}) + H_2O$$

$$MgO(\text{solid}) + SO_3(\text{gas}) \rightarrow MgSO_4(\text{solid at temperatures under 2,000° F.})$$

$$MgCl_2 + H_2O + \text{heat} \rightarrow MgO + 2HCl$$

The $SO_2$ that is released within the furnace will be converted in the scrubber to calcium sulfite and calcium sulfate, and with subsequent oxidation to gypsum.

The enriched $MgSO_4$ solutions that are produced can be marketed "as is" or they can be purified by crystallization to produce Epsom salts. The heat of solution and/or external heating will facilitate raising the $MgSO_4$ concentration to saturation levels, permitting purification by crystallization. Upon crystallization of $MgSO_4$ as Epsom salts, the chlorides would tend to stay in the mother liquor. The crystals can either be washed and dried for sale as Epsom salts, they can be dissolved in fresh water and sold as a pure $MgSO_4$ solution, or they can be reacted with the weak $CaCl_2$ from the $Mg(OH)_2$ precipitation to produce marketable gypsum and a commercial quality (30+%) $MgCl_2$ solution.

The process described above converts to useful products $MgSO_4$, the major soluble component in the scrubber blowdown bleed stream. $MgCl_2$, a minor product in terms of quantity present in the scrubber blowdown stream, will increase in concentration in the scrubber blowdown liquor unless a suitable bleed is effected. The necessary chloride bleed can be achieved by making a $MgCl_2$ solution that is marketable (about 30% concentration), and additional gypsum, from either the weak scrubber blowdown stream alone or, preferably, from the concentrated $MgSO_4$ solution. The $MgSO_4/MgCl_2$ can be converted into a higher purity, finer gypsum product and $MgCl_2$ by reacting it with a $CaCl_2$ brine or, preferably, with a mixed $CaCl_2$ and $MgCl_2$ brine, either natural or produced by reacting commercial HCl, or byproduct HCl having a concentration of the order of about 18% to about 28%, and dolomitic or calcium-based flue dust. The mixed brine doubles the yield of the magnesium chemical. Moreover, the mixed brine can be prepared economically from waste dolomitic flue dust and waste hydrochloric acid obtained from titanium production processes, or from other industrial processes. The chemical reactions are as follows:

| Waste Acid Solution | | Flue Dust | | |
|---|---|---|---|---|
| Dilute (18 to 25%) HCl | + | $CaO \cdot MgO \cdot 1/2 CO_2$ | $\longrightarrow$ | |
| | | Mixed Chloride Sol'n | | Gas |
| | | $CaCl_2$ + $MgCl_2$ | + | $1/2 CO_2$ |

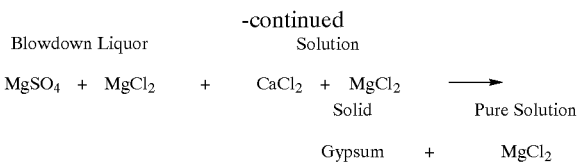

-continued

Blowdown Liquor | Solution
MgSO₄ + MgCl₂ + CaCl₂ + MgCl₂ →
                    Solid      Pure Solution
                    Gypsum  +  MgCl₂

The resulting $MgCl_2$ solution can be sold for applications in multiple industries including textiles, sponge manufacture, detergents, deicing, dust control, and the like.

A high purity $Mg(OH)_2$ can be prepared from the $MgCl_2$ solution prepared as described above by treating the solution with dolomitic lime. Such a treatment would redouble the magnesium chemical yield and produce a $CaCl_2$ stream that could be concentrated and sold, or used as makeup for the process described above.

The processes described above provide significant advantages relative to the method disclosed in the previously-identified Stowe et al. patent. They provide a beneficial means of virtually eliminating the need for disposal of the scrubber blowdown streams by utilizing the magnesium-based compounds for minimizing fireside problems within the furnace, and also by converting the chloride purge to a marketable product. They use waste products that are readily available from other chemical process industries and other scrubber processes to economically produce high-quality, marketable chemicals from the blowdown liquors from lime/limestone scrubbers installed on fossil-fuel-fired furnaces and combustion systems.

Additionally the processes described above avoid the difficult operation of attempting the separation of two solids in a slurry. Instead, they allow the simple and easy removal of solids from a liquid. Whereas the Stowe et al. process produces $Mg(OH)_2$ contaminated with a non-commercial-quality gypsum, in which the $Mg(OH)_2$ is of the order of about 65% to about 75% of the resulting product, it is possible with the processes described above to make a 98% purity commercial $Mg(OH)_2$ and modestly increase the quality and quantity of gypsum that can be marketed. Similarly, MgSO4- and $MgCl_2$-based products with 99% purity or better can be recovered when using the processes described above.

It should be noted that all of the processes described herein are unlikely to be simultaneously employed in any one combustion system. The process alternative that is selected will be based on the plant operating objectives and the cost of the particular waste product deliveries to the specific processing site at which those waste materials are to be utilized.

Referring to the drawings, FIG. 1 is a flow chart showing the materials and process steps by which the micron- and submicron-size MgO particles are produced and the results of their use. The products 10 that are produced by the combustion of the fossil fuel pass through a conventional lime scrubber and gypsum recovery process 12 to reduce the quantity of the environmentally-undesirable sulfur oxides in the flue gases by exposing them to a magnesium-containing, lime-based slurry. The resulting products include gypsum 14 and a relatively dilute solution of MgSO4 and $MgCl_2$. A portion 16 of the stream is bled off to a mix tank 18 into which a thickening agent 20, such as carboxy methyl cellulose or colloidal silica, is added, along with a $MgSO_3/MgSO_4$ powder 22 to enrich the solution to increase its magnesium content. The stream can also be aerated to adjust the proportion of soluble sulfate and insoluble sulfite.

A portion of the enriched bleed stream, which is in the form of a slurry, is introduced into the upper region of the furnace in step 24, at a point where the temperatures are of the order of about 2400° F. The slurry flash calcines in step 26 into MgO particles of both micron size 28 and submicron size 32, as well as $SO_2$ at step 25, which is conveyed to lime scrubber 12 with the combustion products.

The micron-size particles 28 that are produced in the flue gas stream impinge on and coat the boiler tubes 30 to inhibit additional $SO_3$ generation and to reduce ash deposits on the tubes. The submicron-size particles 32 that are produced intermix with the hot combustion gases and combine with the $SO_3$ in the combustion products in step 34 to form particulate $MgSO_4$, which is recovered in the precipitator 36 along with fly ash 38. The flue gas, which retains trace quantities of $MgSO_4$ and ash, continues on to lime scrubber 12.

A second portion of the enriched bleed stream is conveyed to specially modified soot blowers 42, to directly contact the boiler tubes for ash control. If the soot blower valves are closed, the bleed stream is returned to the mix tank through a recirculation loop 44.

Figure 2:
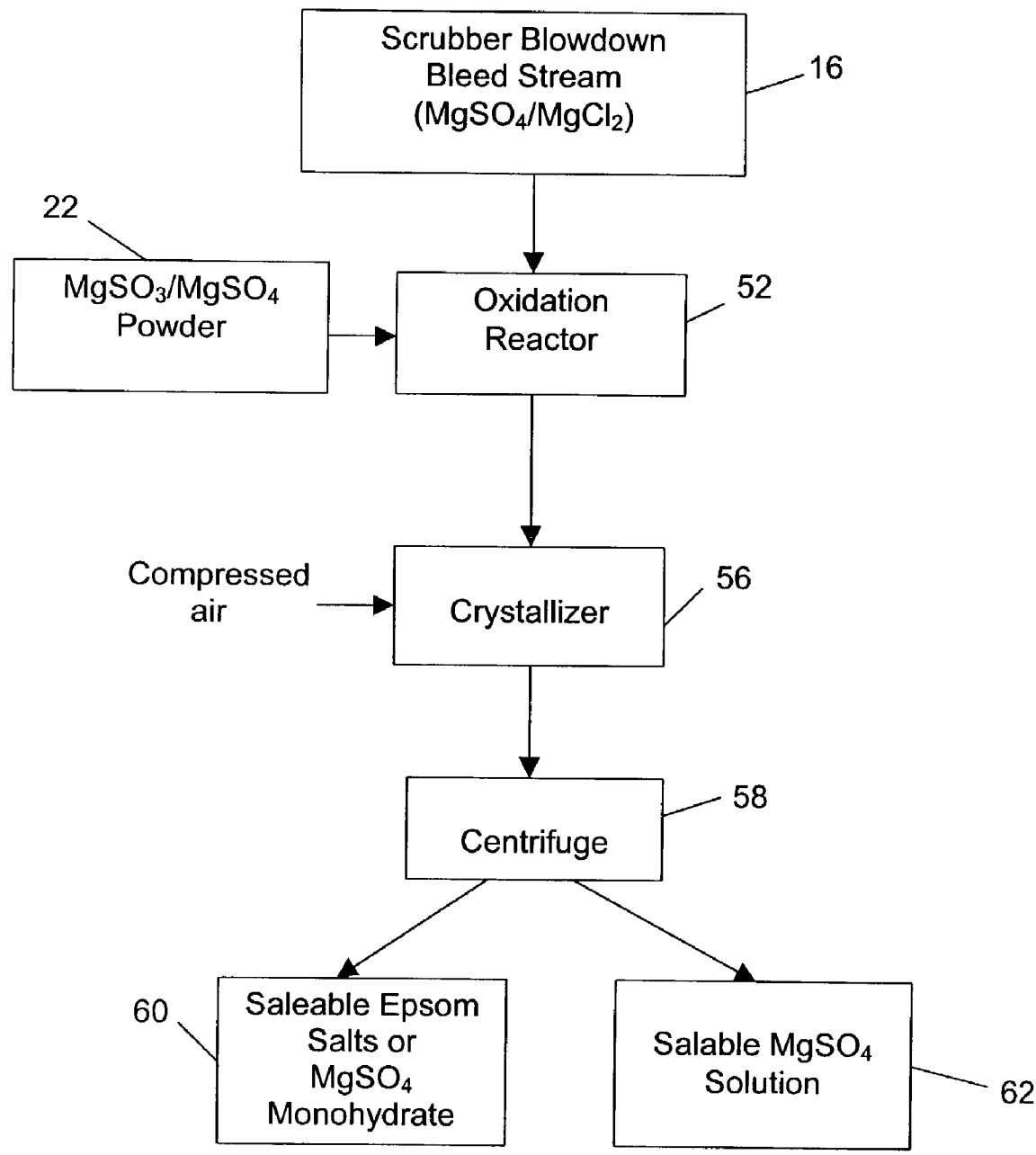
FIG. 2 is a flow chart showing steps in a process for providing marketable chemicals from industrial process waste products.

FIG. 2 is a flow chart showing the optional process steps that another portion of the scrubber blowdown stream 16 undergoes. The bleed stream passes to an oxidation reactor 52, to which $MgSO_3/MgSO_4$ powder 22 is added to enrich the solution to increase its magnesium content, and where compressed air is passed through the slurry to convert the sulfite component to sulfate. The resulting oxidized slurry is conveyed to a crystallizer 56 where it is cooled. The cooled solution is centrifuged in step 58 to separate in step 60 either Epsom salts or $MgSO_4$ monohydrate, depending upon the crystallizer temperature, from a saleable $MgSO_4$ solution 62.

Figure 3:
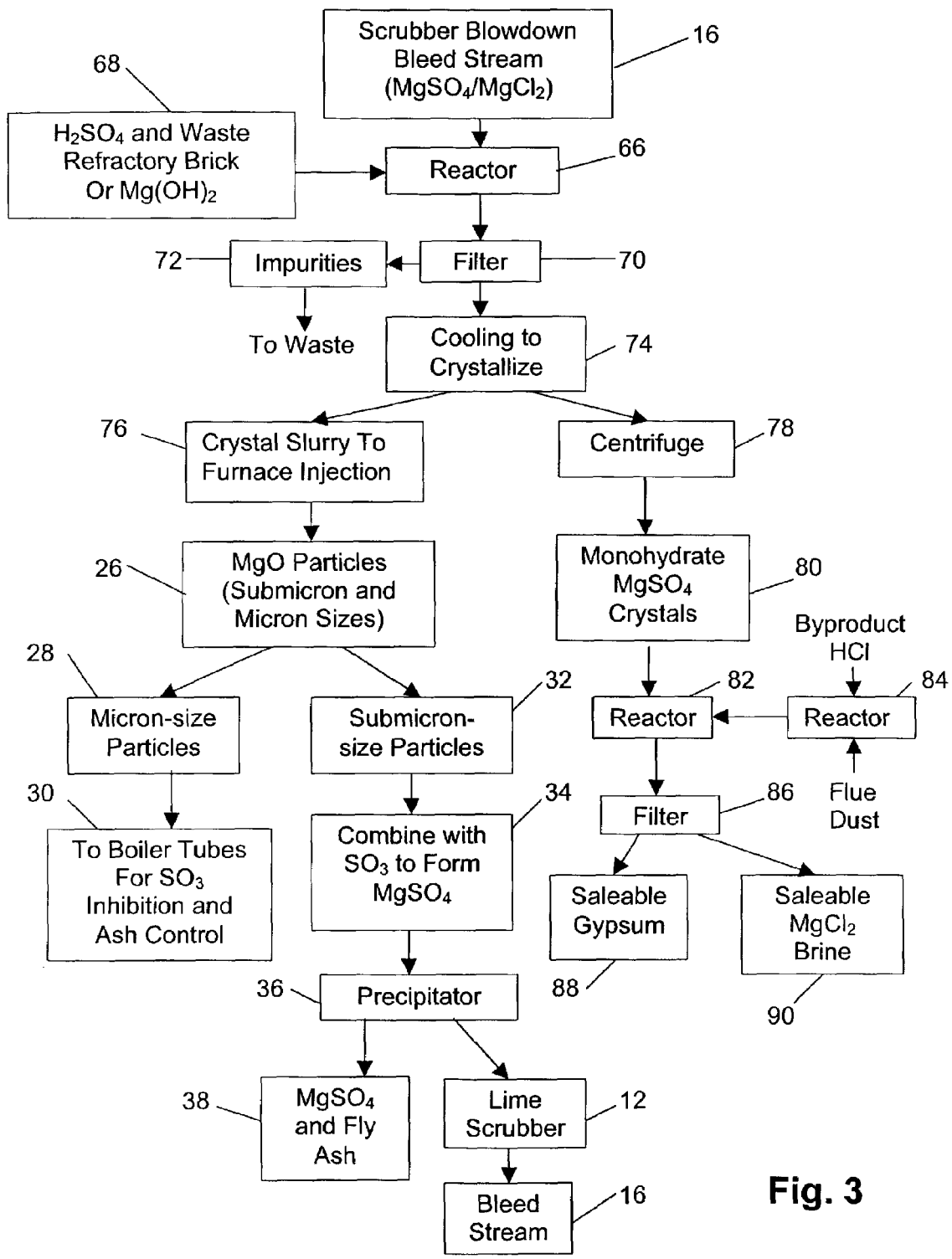
FIG. 3 is a flow chart showing steps in another process for reducing undesirable furnace emissions, for reducing furnace ash deposits, and for providing marketable chemicals from industrial process waste products.

FIG. 3 is a flow chart for an alternative process to utilize a scrubber blowdown bleed stream for providing saleable materials. The bleed stream 16 is enriched in a reactor 66 by the addition of a mixture 68 of $H_2SO_4$ and waste refractory brick, containing MgO, to produce a $MgSO_4$ solution. The solution is filtered in step 70 to remove impurities 72 and is then cooled to crystallize the monohydrate as a suspension in the solution in step 74. Part of the crystal suspension is injected into the upper furnace region in step 76, as in the process shown in FIG. 1, and the remaining part is centrifuged in step 78 to provide monohydrate $MgSO_4$ crystals 80. The $MgSO_4$ crystals are reacted in reactor 82 with the brine product produced by reacting byproduct HCl having a concentration of the order of from about 18% to about 28%, and dolomitic or calcitic flue dust, $CaCl_2$, or $CaCl_2.MgCl_2$, that have been reacted in reactor 84. The resulting product is filtered or centrifuged in step 86 to separate saleable gypsum 88 from saleable $MgCl_2$ brine 90.

FIG. 4 is a flow chart for another alternative process to utilize a scrubber blowdown stream to provide submicron- and micron-size MgO particles for emissions and ash deposit control. The blowdown stream 16 is conveyed to an evaporator 94 to increase the $MgSO_4$ concentration. The concentrated solution is cooled in a crystallizer 96 to crystallize magnesium monohydrate, and the resulting slurry is injected into the upper furnace region in step 98 to provide the desired submicron- and micron-size MgO particles 26.

FIG. 5 is a flow chart showing the processing steps for further treating the $MgCl_2$ brine resulting from the process shown in FIG. 3, to provide MgO particles for boiler tube treatment and also saleable chemicals. Lime or dolomitic lime hydrates 102 are reacted with the brine 90 in a reactor 106 and the resulting reaction product is thickened and filtered in step 108 to provide a slurry that can be sold or injected into the furnace in step 24 to form micron-size MgO particles 26 to contact the boiler tubes 30, and another part of which is separated to provide a saleable $Mg(OH)_2$ slurry 114. The filtrate from the filter is conveyed to a concentrator 116 to be separated into either saleable $CaCl_2$ brine 118 or to be used in step 82 of FIG. 3 to precipitate gypsum.

The following examples illustrate how the processes disclosed herein can be carried out.

EXAMPLE 1

In a 1200 MW power generation plant, 500 tons per hour of coal having a 4% sulfur and a 10% ash content are fired for steam production purposes. Though having the usual complement of steam soot blowers, the power plant has historically been plagued by sporadic and damaging slag falls, three-day outages to clean corrosive deposits from the air heaters, and a blue-gray $SO_3$ plume that at times loses buoyancy and exposes adjacent property to a cloud of weak sulfuric acid.

The sulfur dioxide resulting from combustion is treated in a scrubber system with magnesium-enhanced lime to capture the $SO_2$, and the resulting calcium sulfite is oxidized to form gypsum. The scrubber produces a 400 gpm bleed stream that normally is conveyed to the plant wastewater facility where it is treated and discharged to a nearby river. The bleed stream is at a temperature of about 160° F., it is relatively low in dissolved solids, and it contains about 3.7% $MgSO_4$, 0.2% $MgCl_2$, and 0.8% insolubles. The insolubles are mostly in the form of silica, aluminum, and iron, and are derived from the lime.

In order to treat the slagging, fouling, and corrosion within the furnace, as well as the emissions problems, 56 gpm of the bleed stream is diverted from the waste water plant feed system and is enriched by the addition of 27 lbs per minute of $MgSO_3/MgSO_4$ powder to enrich the bleed stream. The bleed stream flows to a 10,000 gallon agitated mix tank, the flow to which is regulated by a rotameter. The $MgSO_3/MgSO_4$ powder, which is stored in a 50 ton capacity bin, is metered to the mix tank through a vibrating powder feeder. The amounts of total dissolved (4.5%) solids and slurried (3.3%) solids in the mix are relatively low, and small amounts of a stabilizing thickening agent such as colloidal silica or carboxymethyl cellulose can also be metered into the mix tank, if desired, to enhance slurry stability.

The thickened slurry overflows from the mix tank to a 1,000 gallon agitated additive feed system that includes 7 positive-pressure metering pumps (6 operating pumps and one spare), with each of the operating pumps delivering approximately 10 gpm to 6 air-aspirated injectors through high pressure rubber hose. The injectors are mounted above the burners but just below the level at which a transition from radiant heat transfer to convective heat transfer occurs. The slurry is injected in atomized form into the combustion gases that are at a temperature of about 2,400° F. The water in the slurry flashes off at those temperatures, and the magnesium salts flash calcine to solid MgO particles (sub-micron-size MgO particles from the $MgSO_4$ solution and micron-size MgO particles from the solids in the $MgSO_3$-containing slurry) and $SO_2$. The $SO_2$ produced is reacted within the lime scrubber system and is recovered as an incremental increase in gypsum yield.

The coarser, micron-size MgO particles coat the convective pass boiler tube surfaces, to interfere with the catalysis of $SO_2$ to $SO_3$, and to reduce ash deposits on the boiler tubes. The finer, submicron-size MgO particles are carried past the convective pass boiler tube surfaces to react downstream with the $SO_3$ that is formed during combustion of the fuel, by catalysis of $SO_2$ to $SO_3$ in the convective boiler pass, and/or is produced by a selective catalytic reactor installed for $NO_x$ control, thereby minimizing fouling and corrosion within the downstream air preheater and also reducing the amount of acid in the stack discharge plume. Most of the $MgSO_4$ reaction product is captured along with the fly ash in the precipitator, or in the scrubber. The Mg and $SO_3$ concentrations present in the fly ash are both suitably below the concentrations that would adversely affect the marketability of the fly ash for cement applications.

A separate recirculating loop carries slurry from the additive mix tank to and back from six specially modified, retractable soot blowers that serve the serve the convective tube bank. Via the blowers, the slurry is applied directly on the boiler tubes where slagging is a problem. If none of the valves to the soot blowers are open the slurry can be returned to the mix tank. Thus, if the injection rate of furnace additive introduced to control $SO_3$-related problems is not sufficient to prevent ash buildup in the convective pass of the boiler, the power plant operator can actuate the selected soot blowers to introduce the slurry into desired regions of the convective tube bank. The soot blowers can first cycle in and out of the tube bank, blowing steam to remove accumulated deposits from the tube surfaces. They then can repeat the cycle, delivering slurry (from the now-open recirculating loop valve) directly through the hot gases, which are at a temperature of about 2,000° F. to about 2,300° F., and onto the surfaces of the hot boiler tubes, which are at a surface temperature of about 1,000° F. The same drying and flash calcining described above takes place, but the amount of additive material that is applied is much smaller (approximately five pounds per cycle and usually only one or two cycles per day) because it is focused on only those surfaces where deposition problems have been known to occur.

The furnace treatment described above will result in a cleaner boiler section, one that is relatively free of deposits, which can be evidenced by visual inspection. The treatment will also result in virtual elimination of the use of steam sprays in the attemperators in both the superheater and the reheater of the plant, as well as a reduction of air heater washings from about 6 per year to about 2 per year, coupled with reduced cold end duct fouling and corrosion. The furnace exit temperatures of the combustion products will be reduced by about 50° F., and the increased boiler cleanliness will result in a reduction of soot blowing frequency from several times each operating shift to about once daily. Also resulting from the increased boiler cleanliness will be a 50% or greater increase in plant operating time at maximum load before it becomes necessary to reduce plant load in order to shed slag.

From the standpoint of environmental benefits accruing from the described furnace treatment, the visible $SO_3$ stack plume will be virtually eliminated, as will the acid smut fallout in areas adjacent to the plant. Also, flue gas exit temperatures will be reduced by about 20 to 30° F. or more, thereby reducing thermal pollution and yielding a gain in furnace operating efficiency of the order of about 0.5% to about 0.7%.

EXAMPLE 2

The conditions are substantially the same as those described in Example 1 above, except that the 80+% fraction of the scrubber bleed stream that is not utilized in treating fireside problems within the furnace is mixed with sufficient $MgSO_3/MgSO_4$ to bring the $MgSO_4$ concentration in the bleed stream to about 32.5% after oxidation of the MgSO$_3$. The mixing step is accomplished in an air-sparged, agitated, 30,000 gallon, fiberglass reactor with 340 gpm of bleed stream diverted from the plant waste stream, and with MgSO$_3$/MgSO$_4$ added at a rate of about 860 lbs/minute. The partially-oxidized slurry overflows into a second oxidation reactor, and the resulting MgSO$_4$ solution, which is maintained at about 120° F. by circulating a side stream of the solution through heat exchangers, is transferred to a crystallizer where it is cooled to 72° F. The crystallizer yields about 272 pounds/min of epsom salts that are separated from the mother liquor in a centrifuge. The Epsom salts are either dried for sale or are used to make gypsum and MgCl$_2$ for sale. The mother liquor at a concentration of about 27% MgSO$_4$ is transferred to storage and sold as a liquid for various chemical applications.

EXAMPLE 3

The conditions are substantially the same as those described in Example 2, except that all of the scrubber blowdown bleed is enriched by adding H$_2$SO$_4$ and reclaimed refractory MgO, which react to produce MgSO$_4$ directly in the bleed stream and without the need for oxidation. The 400 gpm of scrubber blowdown bleed serves as a base for the reaction of 430 pounds/min of the reclaimed MgO and 880 pounds/min of H$_2$SO$_4$.

Temperature control is effected as in Example 2, but the MgSO$_4$ solution is held in the temperature range of from about 190° F. to about 200° F., and is filtered to remove impurities before being cooled to a temperature range of from about 165° F. to about 170° F. to crystallize the monohydrate. Part of the monohydrate suspension in the MgSO$_4$ mother liquor is conveyed to the furnace injection system. On injection of 50 pounds per minute of the suspension, the solid crystals and magnesium salt solution combination yields about 17 lbs per minute of the blend of micron- and submicron-size MgO particles that provide improved efficiency in mitigating fireside problems within the furnace. The balance of the suspension is centrifuged to yield monohydrate crystals, which are reacted with the brine product from reaction of HCl and dolomitic or calcium-based flue dust to produce marketable gypsum, along with a commercial quality of MgCl$_2$ brine for sale, or for manufacture of a high purity Mg(OH)$_2$ for boiler treatment or sale. The MgCl$_2$ brine has from about a 30% to about a 33% concentration.

EXAMPLE 4

The conditions are substantially the same as those identified in Example 1, except the scrubber bleed stream is to be converted for use only in controlling furnace fireside problems, not for the purpose of producing other marketable chemicals. Approximately 155 gpm of the bleed stream is diverted to a multistage evaporator where it is concentrated to a MgSO$_4$ content of about 32.5%. It is then cooled to about 165° F. to crystallize magnesium monohydrate, and the hot crystal suspension is injected into the furnace by the injection system described in Example 1.

All the percentages specified herein for constituents and for concentrations are to be understood to be on a weight basis.

In addition to the suitability of magnesium compounds for the boiler treatment processes disclosed herein, it is believed that other alkali metal compounds, based upon calcium, sodium, and potassium, for example, can provide similar results in terms of SO$_3$ reduction. In that regard, the lower costs associated with some calcium or sodium compounds might make such compounds attractive from an economic standpoint, but their potential to compound slagging and fouling problems is likely to limit their application to lower temperature parts of the boiler.

Although particular embodiments of the present invention have been illustrated and described, it will be apparent to those skilled in the art that changes and modifications can be made without departing from the spirit of the present invention. Accordingly, it is intended to encompass within the appended claims all such changes and modifications that fall with the scope of the present invention.

What is claimed is:

1. A process for reducing fossil-fuel-fired furnace operating and emissions problems, such as ash deposits, corrosion, and SO$_3$ discharges, said method comprising the steps of:
   a. providing a liquid containing at least one soluble magnesium compound and one insoluble magnesium compound;
   b. introducing the liquid into a combustion region of the furnace at a point where the temperature within the furnace is sufficiently high to decompose the magnesium compounds to provide within the furnace a first multiplicity of fine magnesium oxide particles having particle sizes smaller than one micron, to react with SO$_3$ within the furnace to form MgSO$_4$, and to provide within the furnace a second multiplicity of magnesium oxide particles having particle sizes that range from about one micron to about 5 microns, for deposit on furnace internal surfaces to coat the surfaces and impede catalytic generation of SO$_3$ at the coated furnace internal surfaces; and
   c. collecting the MgSO$_4$ in a collection zone downstream of the furnace.

2. A process in accordance with claim 1, wherein the solution of soluble magnesium compounds is derived from furnace exhaust scrubber blowdown liquor.

3. A process in accordance with claim 2, wherein the scrubber blowdown liquor has a concentration of magnesium compounds of from about 2% to about 35% by weight.

4. A process in accordance with claim 2, including the step of enriching the scrubber blowdown liquor by the addition of waste-derived magnesium compounds.

5. A process in accordance with claim 4, wherein the enrichment is to a concentration of from about 5% to about 35% by weight of MgSO$_4$.

6. A process in accordance with claim 5, wherein the enrichment step includes the addition of a waste stream containing a mixture of solid magnesium sulfite and magnesium sulfate.

7. A process in accordance with claim 6, wherein the waste stream is derived from a flue gas desulfurization system.

8. A process in accordance with claim 5, wherein the enriching step includes adding a reaction product obtained by reacting a waste sulfuric acid and crushed reclaimed magnesium oxide refractory brick.

9. A process in accordance with claim 4, wherein the compounds to provide magnesium enrichment are selected from the group consisting of magnesium sulfate, magnesium sulfite, magnesium carbonate, magnesium acetate, magnesium oxide slurry, magnesium hydroxide, and combinations and mixtures thereof.

10. A process in accordance with claim 1, including the step of introducing the insoluble magnesium compounds into soot blowers provided on the furnace for blowing soot from boiler tubes within the furnace, to reduce ash deposits on boiler tubes contained within the furnace.

11. A process in accordance with claim 10, including the step of introducing the insoluble magnesium compounds into selected ones of the soot blowers to control ash deposits at particular regions of the boiler tubes.

12. A process in accordance with claim 1, wherein the liquid is introduced by injecting it into the upper region of the furnace.

13. A process in accordance with claim 1, wherein the liquid is introduced by spraying it into the upper region of the furnace in droplet form.

14. A process in accordance with claim 1, wherein the temperature in the upper furnace is from about 2000° F. to about 2400° F.

15. A process in accordance with claim 1, wherein the soluble magnesium compound is selected from the group consisting of $MgCl_2$, $MgSO_4$, $MgNO_2$, magnesium acetate, $Mg(HSO_3)_2$, and combinations and mixtures thereof.

16. A process in accordance with claim 1, wherein the liquid is an aqueous solution.

17. A process in accordance with claim 1, wherein the liquid is an organic liquid.

18. A process in accordance with claim 1, wherein the liquid contains from about 2% to about 7% magnesium sulfate.

19. A process in accordance with claim 18, including the step of enriching the proportion of magnesium-containing compounds to a level of from about 25% to about 35%.

20. A process in accordance with claim 19, wherein the enrichment step is effected by adding solids derived from MgO scrubbing of flue gas.

21. A process in accordance with claim 19, wherein the enrichment step is effected by adding an $MgSO_4$ solution that includes suspended $MgSO_3$ solids.

22. A process in accordance with claim 19, wherein the enrichment step is effected by evaporating a proportion of the water contained in the liquid.

23. A process in accordance with claim 19, including the step of adding the enriched slurry to soot blowers that are positioned to apply a stream of fluid directly on those boiler tubes within the furnace that are prone to accumulate slag.

24. A process in accordance with claim 1, wherein the liquid includes overbased organic compounds containing metal salts selected from the group consisting of magnesium hydroxide, magnesium oxide, magnesium carbonate, and combinations and mixtures thereof, as a source for the first multiplicity of fine magnesium oxide particles.

* * * * *